US009429961B2

(12) United States Patent
Sprinkle et al.

(10) Patent No.: US 9,429,961 B2
(45) Date of Patent: Aug. 30, 2016

(54) DATA-DRIVEN HVAC OPTIMIZATION

(71) Applicant: University of Arizona, Tucson, AZ (US)

(72) Inventors: Jonathan Sprinkle, Tucson, AZ (US); Xiao Qin, Tucson, AZ (US); Susan Lysecky, Tucson, AZ (US)

(73) Assignee: The Board of Arizona Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 14/314,704

(22) Filed: Jun. 25, 2014

(65) Prior Publication Data
US 2015/0378373 A1 Dec. 31, 2015

(51) Int. Cl.
*G05D 23/19* (2006.01)
(52) U.S. Cl.
CPC .................................. *G05D 23/1917* (2013.01)
(58) Field of Classification Search
CPC ....................................................... G05D 23/19
USPC ........................... 700/276, 278, 291; 236/1 B
See application file for complete search history.

(56) References Cited

U.S. PATENT DOCUMENTS

2005/0194455 A1* 9/2005 Alles .............................. 236/1 B

OTHER PUBLICATIONS

Electricity Advisory Committee (EAC), Smart Grid: Enabler of the New Energy Economy, Electricity Advisory Committee, Tech. RP. [Online], Available: http://energy.gov/oe/downloads/smart-grid-enabler-new-energy-economy (Dec. 2008).
U.S. Department of Energy, The Smart Grid: An Introduction, [Online], Available: http://www.oe.energy.gov/1165.htm (2008).
G. Gao and K. Whitehouse, The Self-Programming Thermostat: Optimizing Setback Schedules Based on Home Occupancy Patterns, In Proc. ACM Workshop Embedded Sensing Syst. Energy-Efficiency Buildings (Buildsys), 2009, pp. 67-72.
Tuscon Electric Power (TEP), TEP Power Partners, [Online], Available: http://www.tendrilinc.com/press/tendril-drives-successul-demand-response-program-for-tucson-electric-power, Accessed Aug. 2014.
Nest. [Online] Available: http://www.nest.com, Accessed Aug. 2014.
Tucson Electric Power (TEP). Powershift Program. [Online] Available: https://www.tep.com/doc/customer/inserts/2009_02_powershift.pdf, Accessed Aug. 2014.
J. Froehlich, Promoting Energy Efficient Behaviors in the Home Through Feedback: The Role of Human-Computer Interaction, In Proc. HCIC Winter Workshop, 2009.
T. Hargreaves, M. Nye and J. Burgess, Making Energy Visible: A Qualitative Field Study of How Householders Interact With Feedback From Smart Energy Monitors, Energy Policy, vol. 38, No. 10, pp. 6111-6119, Oct. 2010, [Online] Available: http://www/sciencedirect.com/science/article/pii/s030142151000460x.

(Continued)

*Primary Examiner* — Tejal Gami
(74) *Attorney, Agent, or Firm* — Blank Rome LLP

(57) ABSTRACT

A system and method for data-driven HVAC optimization for outputting HVAC setpoints to a thermostat and determining a predicted HVAC usage of an HVAC unit based on the HVAC setpoints and an outdoor temperature. The system may further determine and output a predicted cost of the HVAC unit heating or cooling a structure based on the HVAC setpoints. The system may further select optimized HVAC setpoints such that the predicted cost is less than or equal to a user defined cost constraint and minimize deviation from user-preferred HVAC setpoints.

21 Claims, 8 Drawing Sheets

(56) References Cited

OTHER PUBLICATIONS

N. L. Miller, et al., Climate Extreme Heat, and Electricity Demand in California, J. Appl. Meteorol. Climatol., vol. 47, pp. 1834-1844, Jun. 2008 [Online] Available: http://dx.doi.org/10.1175/2007jamc1480. 1.

Frontline, California Crisis Timeline, [Online] Available: http://www.pbs.org/wgbh/pages/frontline/shows/blackout/california/timeline.html, Accessed Aug. 2014.

C.E. Garcia, et al., Model Predictive Control: Theory and Practice—A Survey, Automatica, vol. 25, No. 3, pp. 335-348, May 1989.

Y. Ma, et al., Model Predictive Control for the Operation of Building Cooling Systems, IEEE Trans. Control Syst. Technol., vol. 20, No. 3, pp. 796-803, May 2012.

F. Oldewurtel, et al., Use of Model Predictive Control and Weather Forecasts for Energy Efficient Building Climate Control, Energy Buildings, vol. 45, pp. 15-27, Feb. 2012.

A Aswani, et al., Identifiying Models of HVAC Systems Using Semi-Parametric Regression, In Proc. Amer. Control Conf. (ACC), 2012, pp. 3675-3680.

A Aswani, et al., Energy-Efficient Building HVAC Control Using Hybrid System LBMPC, In Proc. $4^{th}$ IFAC Nonlinear Model Predict. Control Conf., Noordwijkerhout, The Netherlands, 2012, pp. 496-501.

S. Privara, et al., Modeling and Identification of a Large Multi-Zone Office Building, In Proc. IEEE Int. Conf. Control Appl. (CCA), Sep. 2011, pp. 55-60.

J. Siroky, et al., Experimental Analysis of Model Predictive Control for an Energy Efficient Building Heating System, Appl. Energy, vol. 88, No. 9, pp. 3079-3087, 2011.

S. Wang, et al., Parameter Estimation of Internal Thermal Mass of Building Dynamic Models Using Genetic Algorithm, Energy Convers. Manag., vol. 47, Nos. 13-14, pp. 1927-1941, Aug. 2006.

D. Sturzenegger, et al., Semi-Automated Modular Modeling of Buildings for Model Predictive Control., In Proc. $4^{th}$ ACM Workshop Embedded Sensing Syst. Energy-Efficiency Buildings (Buildsys), Nov. 2012, pp. 99-106.

S. Karatasou, et al., Modeling and Predicting Building's Energy Use With Artifical Neural Networks: Methods and Results, Energy Buildings, vol. 38, No. 8, pp. 949-958, 2006.

A. Beghi, et al., Load Forecasting for the Efficient Energy Management of HVAC Systems, In Proc. IEEE Int. Conf. Sustain. Energy Technol. (ICSET), Dec. 2010, pp. 1-6.

A. E. Ben-Nakhi, et al., Cooling Load Prediction for Buildings Using General Regression Neural Networks, Energy Convers. Manag. vol. 45, Nos. 13-14, pp. 2127-2141, 2004.

S. Karatasou, et al., Prediction of Energy Consumption in Buildings With Artifical Intelligent Techniques and Chaos Time Series Analysis, In Proc. Int. Workshop Energy Perform. Environ. Quality Buildings, 2006.

J. Yang, et al., On-Line Building Energy Prediction Using Adaptive Artifical Neural Networks, Energy Buildings, vol. 37, No. 12, pp. 1250-1259, 2005.

P. A. Gonzaelez, et al., Prediction of Hourly Energy Consumption in Buildings Based on a Feedback Artifical Neural Network, Energy Buildings, vol. 37, No. 6, pp. 595-601, 2005.

N. Amjady, Short-Term Hourly Load Forecasting Using Time-Series Modeling With Peak Load Estimation Capability, IEEE Trans. Power Syst., vol. 16, No. 4, pp. 798-805, Nov. 2001.

V. Cherkassky, et al., Prediction of Electric Power Consumption for Commercial Buildings, In Proc. Int. Joint Conf. Neural Netw. (IJCNN), Jul./Aug. 2011, pp. 666-672.

L. Stanek, et al., Model-Aided Diagnosis: An Inexpensive Combination of Model-Based Condition Assessment, IEEE Trans. Syst., Man, Cybern. C, Appl. Rev., vol. 31, No. 2, pp. 137-145, May 2001.

K. Daou, et al., Desiccant Cooling Air Conditioning: A Review, Renewable Sustainable Energy Rev., vol. 10, No. 2, pp. 55-77, 2006 [Online] Available: http://www.sciencedirect.com/science/article/pii/s1364032104001200.

J. B. Orlin, A Polynomial Time Dual Simplex Algorithm for the Minimum Cost Flow Problem, In Proc. Symp. Math. Program, 1985.

\* cited by examiner

DATA-DRIVEN HVAC OPTIMIZATION

This invention was made with government support under Grant Nos. NSF CNS-0930919 and IIP-1249175 awarded by National Science Foundation. The government has certain rights in the invention.

BACKGROUND OF THE INVENTION

A heating, ventilation and air conditioning (HVAC) system conditions the environment in a targeted space to a desired temperature and/or comfort level. HVAC systems range from a simple stove in a home environment to a complex air conditioning system in an airplane or submarine. An HVAC system is typically capable of offering some (if not total) control of temperature, humidity, ventilation, and/or filtration. The most common HVAC system is a building HVAC system, which keeps the indoor atmosphere comfortable for a home and/or workplace. Some HVAC systems offer "intelligent" features such as multiple programmable temperature set points based on time of day and/or day of the week to machine learning mechanisms that determine the occupant's habits. Almost all HVAC systems, however, require some input from end users to controls the desire operation of the HVAC system.

When choosing temperature setpoints for an HVAC system, an end user is typically balancing desires to both maintain a level of comfort and to minimize cost. With traditional HVAC systems, however, the end user cannot obtain a reliable estimate of the cost of chosen HVAC setpoints until after the fact when a utility bill arrives. Even adjusting HVAC setpoints based on the cost from a previous month may not be sufficiently predictive of changes in outdoor weather that may affect the amount of energy and cost required to obtain the adjusted HVAC setpoints.

A homeowner may be willing, for example, to spend $200 to keep an indoor temperature below 82° F. for a certain time period, but may not be willing to spend $250 to keep the indoor temperature below 80° F. for the same time period. Accordingly, in order to effectively balance comfort level and cost, there is a need for data-driven HVAC optimization that provides end users with an immediate cost estimate for HVAC setpoints.

It is difficult for a homeowner to predict the energy cost of an HVAC setpoint. Energy consumption is invisible to the end user and abstract. Additionally, energy may be priced dynamically by a local utility company based on time of day (e.g., "peak", "off-peak", "shoulder", etc.). Traditional methods of estimating HVAC costs have significant drawbacks. Analytical modelling and software simulation, where mathematical equations are developed based on the physical attributes of a building (e.g., footprint, insulation material, location, orientation, etc.), require significant expertise to model complex systems. Furthermore, unique analytical models must be built for each unique building. Conventional data-driven modelling, including data mining and machine learning algorithms, is computationally expensive and is therefore unsuitable for implementation in a low cost system for broad public use.

Accordingly, there is a need for data-driven HVAC optimization that allows end users to make well-informed decisions by providing accurate medium term (e.g., 10-day) predictions for any building using low cost sensors, existing HVAC infrastructure, and available data.

SUMMARY OF THE INVENTION

According to an aspect of an exemplary embodiment, there is provided a system and method for data-driven HVAC optimization for outputting HVAC setpoints r to a thermostat and determining a predicted HVAC usage $\hat{w}$ of an HVAC unit based on the HVAC setpoints r and an outdoor temperature d. The system may also determine and output a predicted cost C of the HVAC unit heating or cooling a structure based on the HVAC setpoints r. The system may further select optimized HVAC setpoints r* such that the predicted cost C is less than or equal to a user defined cost constraint $C_0$ and minimize deviation from user-preferred HVAC setpoints r.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION OF EXEMPLARY EMBODIMENTS

Figure 1:
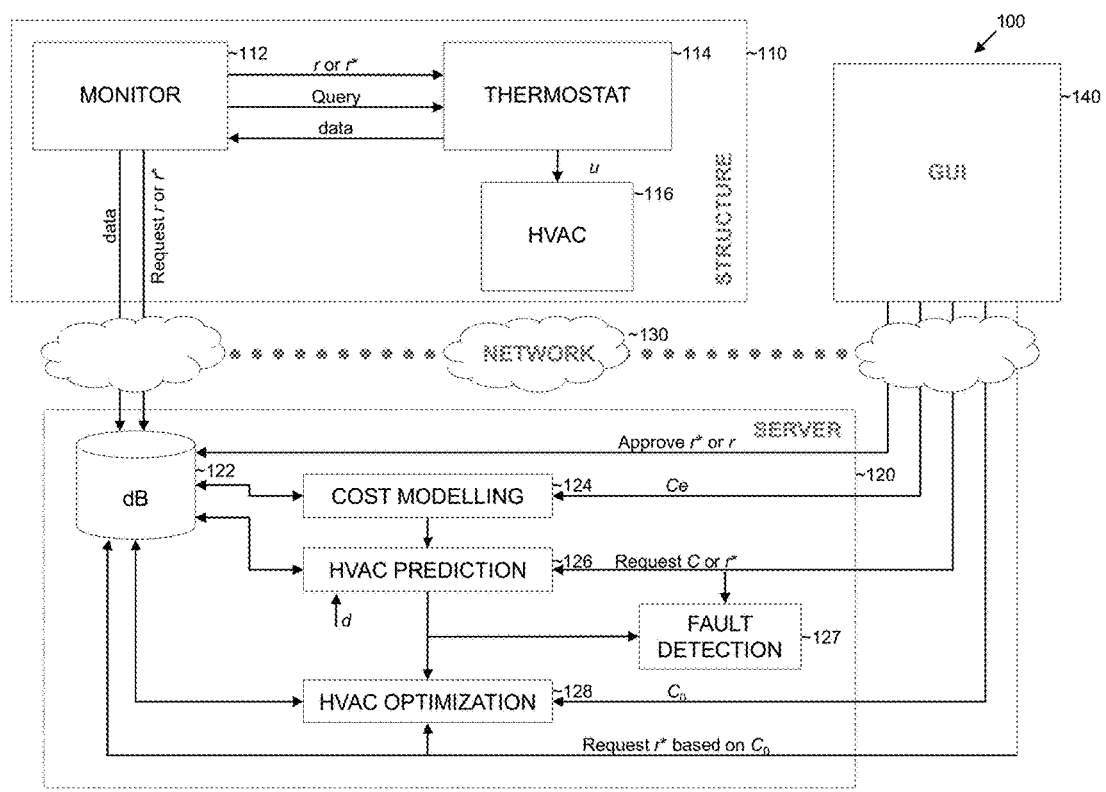
FIG. 1 is a block-level diagram of a system for HVAC optimization according to an exemplary embodiment of the present invention.

Reference will now be made in detail to exemplary embodiments by way of reference to the accompanying drawings, wherein like reference numerals refer to like parts, components, and structures.

FIG. 1 is a block-level diagram of a system 100 for HVAC optimization according to an exemplary embodiment of the present invention. A structure 110, such as a residential home or commercial or industrial building, includes a monitor 112, a thermostat 114, and an HVAC unit 116. A server 120 includes a database 112, a cost modelling unit 124, an HVAC prediction engine 126, a fault detection module 127, and an HVAC optimization engine 128.

As will be described in more detail below, the system 100 may be realized using a commercially available thermostat 114 and an HVAC unit 116 already in use in the structure 110. Each of the cost modelling unit 124, the HVAC prediction engine 126, the fault detection module 127, and the HVAC optimization engine 128 may be realized as computer-readable instructions stored, together with the database 112, on a computer readable storage medium to be read and executed by a processor. The system may also include a graphical user interface (GUI) 140. In an exemplary embodiment of the present invention, the thermostat 114 is a Wi-Fi enabled programmable thermostat, the monitor 112 wirelessly communicates with the thermostat 114 via a local area network (such as a home Wi-Fi network) and with the server 120 over a wide area network 130 (such as the internet). As one of ordinary skill in the art will recognize, however, any or all aspects of the server 120 and/or the monitor 112 may be integrated with the thermostat 114 or realized as separate devices (inside or outside of the structure 110) in communication through any wired or wireless method.

The thermostat 114 controls the HVAC unit 116 by outputting a binary control signal u indicating whether the HVAC unit 116 is to turn off or on. The thermostat 114 outputs control signals u based on the indoor temperature x of the structure 110 and the HVAC setpoints r. In a simple example, if the HVAC setpoint r is less than the indoor temperature x of the structure 110, the thermostat 114 outputs a control signal u to turn on the cooling function of the HVAC. The formula for the control signal u as a function of time may be expressed as shown in Equation (1):

$$u(t) = \begin{cases} 1, & x(t) > r(t) \text{ and } \neg \text{cycle} \\ 0, & \text{otherwise} \end{cases} \quad (1)$$

where cycle is set to true for some time after u(t) switches from 1 to 0. This prevents the thermostat from switching on immediately after it switches off. Cycle time is a necessary component of the HVAC unit 116, since the internal physical components must rest periodically for efficiency reasons. (The HVAC unit 116 can be set to heat or cool. Unless otherwise noted, however, the following description assumes the system is in cool mode, with the corresponding inequalities to be reversed for heat mode.)

Continuous cycling of the HVAC unit 116 may also be prevented by setting a tolerance E above or below the HVAC setpoint r that the indoor temperature must reach before the HVAC unit 116 is turned on or off. This hysteresis may be expressed as shown in Equation (2):

$$u(t) = \begin{cases} 1 & x(t) > r(t) + \epsilon \\ 0 & x(t) < r(t) - \epsilon \\ u(t^-) & \text{otherwise} \end{cases} \quad (2)$$

where $u(t^-)$ represents the previous value of u(t).

The HVAC setpoint r of a programmable thermostat 114 may vary based on time of day. For example, four times of day such as "Morning", "Work", "Evening" and "Night" may be expressed as shown in Equation (3):

$$r(t) = \begin{cases} r_0 & t_0 \leq t < t_1 \\ r_1 & t_1 \leq t < t_2 \\ r_2 & t_2 \leq t < t_3 \\ r_3 & t_3 \leq t < \bar{t} \end{cases} \quad (3)$$

where the successor to $\bar{t}$ is $t_0$ and the cycle repeats daily. Similarly, a 5/2 programmable thermostat may have sets of values of r(t), depending on both the time of day whether the day of the week is a weekday (d≤5) or weekend (d>5), for example, as expressed as shown in Equation (4):

$$r(t) = \begin{cases} r_0 & (t_0 \leq \bar{t} < t_1) \wedge d \leq 5 \\ r_1 & (t_1 \leq \bar{t} < t_2) \wedge d \leq 5 \\ r_2 & (t_2 \leq \bar{t} < t_3) \wedge d \leq 5 \\ r_3 & (t_3 \leq \bar{t} \vee t < t_0) \wedge d \leq 5 \\ r_4 & (t_0 \leq \bar{t} < t_1) \wedge d > 5 \\ r_5 & (t_1 \leq \bar{t} < t_2) \wedge d > 5 \\ r_6 & (t_2 \leq \bar{t} < t_3) \wedge d > 5 \\ r_7 & (t_3 \leq \bar{t} \vee t < t_0) \wedge d > 5 \end{cases} \quad (4)$$

Similar to a convention thermostat, the system 100 may be used to output HVAC setpoints r to the thermostat 114 for controlling the HVAC unit 116 input by a user, for example, through the GUI 140. Unlike a conventional thermostat, however, the system 100 is configured to predict the energy usage and cost C of the HVAC setpoints r. Additionally, the system 100 may be configured to determine optimized HVAC setpoints r* based on a desired cost $C_0$ and output the optimized HVAC setpoints r* to the thermostat 114 to control the HVAC unit 116.

HVAC Prediction

In most instances, the HVAC unit 116 will be either (nearly) fully on or (nearly) fully off. In the summertime, for instance, if the indoor temperature x of the structure 110 is 74° F. and the HVAC setpoint r is 68° F., the HVAC unit 116 will run until the indoor temperature x is at or below the cooling HVAC setpoint r, and then turn off until the indoor temperature x reaches a threshold at or above the cooling HVAC setpoint r and then repeat the cycle again. Similarly, if the HVAC setpoint r is changed to 80° F., the HVAC unit 116 will remain off until the indoor temperature x of the structure 110 naturally rises (if, for example, it is a hot summer day) at or above the HVAC setpoint r. The HVAC usage w of the HVAC unit 116 is best understood as the percentage of time during a given period the HVAC unit 116 is on.

As described above, the relationship between the indoor temperature x and the HVAC setpoint r can be roughly divided into three main categories: Equilibrium, ramp up, and ramp down. Equilibrium describes when the HVAC unit 110 is conditioning the structure 110 such that the indoor temperature x closely correlates to the HVAC setpoint r. In the summer, when the HVAC unit 110 is in cooling mode, ramp down describes when the HVAC setpoint r is lowered and the HVAC unit 110 operates at maximum capacity to reduce the indoor temperature x to the HVAC setpoint r. By contrast, ramp up describes when the HVAC setpoint r changes to a higher temperature and the HVAC unit 110 remains off until the indoor temperature x slowly drifts up (based on the difference between the indoor temperature x and the outdoor temperature d) to the new HVAC setpoint r. (Of course, when the outdoor temperature d is less than the indoor temperature x and the HVAC unit 110 is in heating mode, ramp up is when the HVAC unit 110 operates at maximum capacity to increase the indoor temperature x to the HVAC setpoint r and ramp down describes when the HVAC unit 110 remains off until the indoor temperature x slowly drifts down to the new HVAC setpoint r.)

The HVAC prediction engine 126 determines a predicted HVAC usage ŵ of the HVAC unit 116 based on the relationship described above between the HVAC setpoint r, the indoor temperature x of the structure 110, and the outside temperature d for the geographic area that includes the structure 110, which may be obtained from publicly available sources such as government agency or a weather forecasting service.

During equilibrium, the indoor temperature x is assumed to be equal to the HVAC setpoint r. For each temperature setpoint r, the average HVAC usage w̃ is linearly related to the average difference t* between the HVAC setpoint r and the outdoor temperature d. Therefore, in order to determine a predicted HVAC usage w̃ of the HVAC unit 116 during equilibrium, the HVAC prediction engine 126 stores a constant γ for each potential HVAC setpoint r. If the HVAC unit 116 is predicted to be in equilibrium, the HVAC prediction engine 126 selects the equilibrium constant γ for the HVAC setpoint r and multiplies the selected equilibrium constant γ by the average difference t* between the HVAC setpoint r and the outdoor temperature d. The equilibrium constants γ may be stored, for example, in the database 122. The average HVAC usage IP may be expressed as shown in Equation (5):

$$\tilde{w} = \gamma t^* \tag{5}$$

Each time the HVAC setpoint r changes, the HVAC unit 116 enters either ramp up or ramp down mode and the HVAC usage rate w is either the minimum or maximum usage rate of the HVAC unit 116 as described above. The maximum and minimum HVAC usage rates may be stored, for example, in the database 122. The minimum usage rate may be 0. The maximum usage rate varies based on the HVAC unit 116 and may be detected by the monitor 112 based on data received from the thermostat 114. As described below, the data received from the thermostat 114 by the monitor 112 may include the current HVAC setpoint r, and the current indoor temperature x.

Because HVAC usage is constant during ramp up and ramp down, the HVAC prediction engine 126 only needs to estimate the transition time T either for the structure 110 to float to the new HVAC setpoint r or for the HVAC unit 116 to force the internal temperature x of the structure 110 to conform to the new HVAC setpoint r. For each HVAC setpoint r, the transition time T is linearly related to the change in HVAC setpoint Δr, and the average difference t* between the HVAC setpoint r and the outdoor temperature d. Therefore, in order to determine the transition time T to change from a first HVAC setpoint $r_1$ to a second HVAC setpoint $r_2$, the HVAC prediction engine 126 stores a ramp constant δ for each potential combination of setpoint $r_1$ and $r_2$. If the HVAC unit 116 is predicted to ramp up or ramp down, the HVAC prediction engine 126 selects the ramp constant δ for the HVAC setpoints $r_1$ and $r_2$ and estimates the transition time T by multiplying the selected ramp constant δ, by the difference between the outdoor temperature d and the second HVAC setpoint $r_2$. The transition time T may be expressed as shown in Equation (6):

$$T = \delta(d - r_2) \tag{6}$$

The method of predicting the HVAC usage w̃ described above during equilibrium, ramp up, and ramp down is reasonably accurate when HVAC load demand is high (for example, the cooling load in the summer in Arizona or the heating load in the winter in Minnesota). At other times, however, when the demand of HVAC operation is sparse, there is insufficient data to determine the HVAC usage w̃ using a linear relationship. In other words, when the indoor temperature x floats between a cooling HVAC setpoint $r^c$ and a heating HVAC setpoint $r^h$, the HVAC unit 116 is used sparsely. The lack of HVAC usage data increases the likelihood that a mathematical model may be inaccurate.

The HVAC prediction engine 126 overcomes this potential drawback by determining a predicted indoor temperature x of the structure 110 to determine when the indoor temperature x will likely float between a cooling HVAC setpoint $r^c$ and a heating HVAC setpoint $r^h$. As described below, the HVAC prediction engine 126 calculates the predicted HVAC usage w̃ for this time period (called a "free section") based on the predicted indoor temperature x̂ in addition to the outdoor temperature d and the HVAC setpoints r.

The HVAC prediction engine 126 determines the predicted indoor temperature based on an Auto Regressive Moving Average with eXogenous inputs (AR-MAX) using linear difference Equation (7):

$$\hat{x} = -(a_{1}y(t-1) + \ldots + a_{n_a}y(t-n_a)) + b_1 u(t-n_k) + \ldots + b_{n_b} u(t-n_k-n_b+1) + c_1 e(t-1) + \ldots + c_{n_c} e(t-n_c) + e(t) - \Sigma_{n=1}^{n_a} a_n y(t-n) + \Sigma_{m=1}^{n_b} b_n u(t-n_k-n_b+1) + \Sigma_{q=1}^{n_c} c_q e(t-q) + e(t) \tag{7}$$

where t denotes time, $a_n$, $b_m$, $c_q$ are unknown system parameters, u(t) denotes the input, which could be a matrix when multiple input signals are chosen, $n_a$, $n_b$, $n_c$ are orders associated with output x̂ and inputs, $n_k$ is the number of input samples that occur before the input affects the output, also called the dead time in the system and e(t) is unknown system error. In this work the indoor temperature x̂ is estimated and serves as the model output, while the model inputs are outdoor temperatures (composed of sampled outdoor temperature history data as well as weather forecasting information) as well as the user defined setpoint temperatures. The order of the ARMAX inputs (i.e., the value of $n_a$, $n_b$, $n_k$, $n_c$) are determined using the parsimony principle, where "out of two or more competing models which all explain the data well, the model with the smallest number of independent parameters should be chosen".

The HVAC prediction engine 126 may adjust regression model equation (5) used to determine the predicted HVAC usage w̃ by incorporating the indoor temperature estimation x̂ as another input. Alternatively, the HVAC prediction engine 126 may adjust the predicted HVAC usage w̃ by assuming that usage of the HVAC unit 116 will be 0 when the predicted indoor temperature x̂ of the structure 110 is between a cooling HVAC setpoint $r^c$ and a heating HVAC setpoint $r^h$.

Adaptation

Over time, the relationship between the outdoor temperature d and the HVAC setpoint r may vary due to changes in season or abnormal weather patterns. Unless the HVAC prediction engine 126 accounts for these variations, the predicted HVAC usage w̃ may be inaccurate. Accordingly, the HVAC prediction engine 126 may be configured to update the equations described above for predicting the HVAC usage w̃ during equilibrium w̃=γt*) and for predicting the transition time T during ramp up and ramp down based on feedback received from the monitor 112.

The monitor 112 samples the usage w of the HVAC unit 116 and outputs the observed HVAC usage data w to the server 120 where the data is stored in the database 122 for analysis. The monitor 112 may sample the usage w of the HVAC unit 116 by outputting a query to the thermostat 114 and receiving data from the thermostat 114, such as the current HVAC setpoint r, the current indoor temperature x of the structure 110, and the amount of time that has elapsed since the previous query. The HVAC prediction engine 126 is configured to receive the data from the monitor 112 and compare the relationship between the observed HVAC usage data w and t* (the average difference between the HVAC setpoint r and the outdoor temperature d) and perform regression analysis to determine whether to update the equations to continue to accurately predict HVAC usage w̃. The HVAC prediction engine 126 may adjust the equilibrium constants γ used to determine the order to predict HVAC usage w̃ during equilibrium. Similarly, the HVAC prediction engine 126 may adjust the ramp constants δ used to estimate the transition time T during ramp up and ramp down. The HVAC prediction engine 126 may be configured to perform the regression analysis described above at a fixed time interval $\tau_{up}$ or when the observed HVAC usage w differs from the predicted HVAC usage w̃ is greater than a predefined error threshold T̂.

Certain events may affect the efficiency of the HVAC unit 116. For example, if air conditioning coolant is recharged or a filter is replaced, the HVAC unit 116 will operate more efficiently after the event than before. On the other hand, if the HVAC unit 116 is run while windows are open in the structure 110, the HVAC unit 116 will run less efficiently during the time period when the windows are open. Unless the system 100 is aware of these events and adjusts the calculations accordingly, the system 100 will be unable to accurately determine HVAC usage w̃, optimized HVAC setpoints r*, etc. The end user may indicate via the GUI 140 that a significant event affecting HVAC efficiency has occurred. If so, the server 110 demarcates the data as not characteristic of future behaviour. For example, if the end user indicates via the GUI 140 that the HVAC unit 116 was run with the windows open, the system 100 will use that time period when building linearization models to predicting future HVAC usage w̃, etc. In another example, if the end user indicates via the GUI 140 that coolant has been recharged or a filter has been replaced, the system 100 will mark time period before the efficiency change as less indicative of future efficiency than the time period after, and discount the time period before the HVAC efficiency increase when building linearization models.

Fault Detection

The fault detection unit 127 is configured to receive the data output by the thermostat 114 from the monitor 112 and determine whether there is an equipment failure. The fault detection unit 127 may determine that there is a potential equipment failure if the data received from the monitor 112 indicates that the HVAC usage w or the indoor temperature x of the structure 110 is outside the predicted values. For example, if the HVAC unit 116 is expected to be in equilibrium mode, but that the indoor temperature x of the structure 110 is not within a predetermined threshold of the current HVAC setpoint r, the fault detection unit 127 may output an equipment failure notification to the end user, for example, via the GUI 140. Similarly, the fault detection unit 127 may output an equipment failure notification if the transition time T during ramp up or ramp down is longer than expected or if the HVAC unit 114 departs from equilibrium mode without the HVAC setpoint r changing.

Cost Modelling

The cost modelling unit 124 calculates the cost C of the HVAC setpoints r based on the average HVAC usage w̃ predicted by the HVAC prediction engine 126 and energy costs $C_e$. The energy costs $C_e$ may be a fixed rate or may vary based on the time of day (e.g., peak, off peak, shoulder, etc.) and/or time of year (e.g., summer, winter). The energy costs $C_e$ may also vary based on the source of the energy. For example, the structure 110 may include a renewable energy source such as solar panels that provide energy at little or no cost during daylight hours and a traditional electric utility that provides energy at a fixed or dynamic rate at night. The energy costs $C_e$ may be received by the cost modelling unit 124, for example, from the GUI 140.

In response to HVAC setpoints r input by an end user, the HVAC prediction engine 126 and the cost modelling unit 124 may determine an estimated cost C over a specified time and output the estimated cost C to the end user, for example, via the GUI 140. By providing immediate feedback, the system 100 enables the end user to better balance comfort and cost. Additionally, the system 100 may be configured to determine optimized HVAC setpoints r* based on a desired cost $C_O$ received from the end user, for example, via the GUI 140 and output the optimized HVAC setpoints r* to the thermostat 114 to control the HVAC unit 116.

HVAC Optimization

The HVAC optimization engine 128, coupled with the HVAC prediction engine 126, is configured to enable an end user to specify a cost constraint $C_O$, and produces a corresponding optimized HVAC setpoint schedule r* which adheres to the user defined cost constraint $C_O$ while striving to minimize the difference between desired HVAC setpoints r and actual HVAC setpoints r*. The HVAC optimization engine 128 enables a user to balance cost and comfort without having to design an HVAC setpoint schedule. Also, the HVAC optimization is configured to adapt to the environment and take advantage of dynamic pricing by biasing HVAC usage to non-peak times and performing temperature-cost trade-offs. Moreover, as changes in the platform or predicted outdoor temperature d are detected, the HVAC optimization engine 128 can dynamically adapt the set point schedule r*.

As described below, the HVAC optimization engine 128 selects optimized HVAC setpoints r* such that the predicted cost C is less than or equal to a user defined cost constraint $C_O$ while minimizing the temperature distance D between the user-preferred HVAC setpoints r and the optimized HVAC setpoints r*. Additionally, in order to prevent the thermostat 114 from outputting a "bumping" schedule where the HVAC setpoints change too frequently, the HVAC optimization engine 128 may select optimized HVAC setpoints r* that limit the number of setpoint transitions. For example, the HVAC optimization engine 128 may select HVAC setpoints r* within a transition limit TR of 4 to emulate the real-world setpoint schedule strategy from users where the user would set the temperature to a new point only a few times a day such as "morning", "daytime", "evening", and "night".

The desired HVAC setpoints r may be a constant temperature or may be a series of desired temperatures over time. There may be time periods where the end user specifies that the desired setpoint is unspecified (e.g., the end user does not expect to be home, or will be preparing to leave home during that time period). During those time periods, the temperature distance D is 0 regardless of the optimized HVAC setpoint r* for those time periods.

Figure 2A:
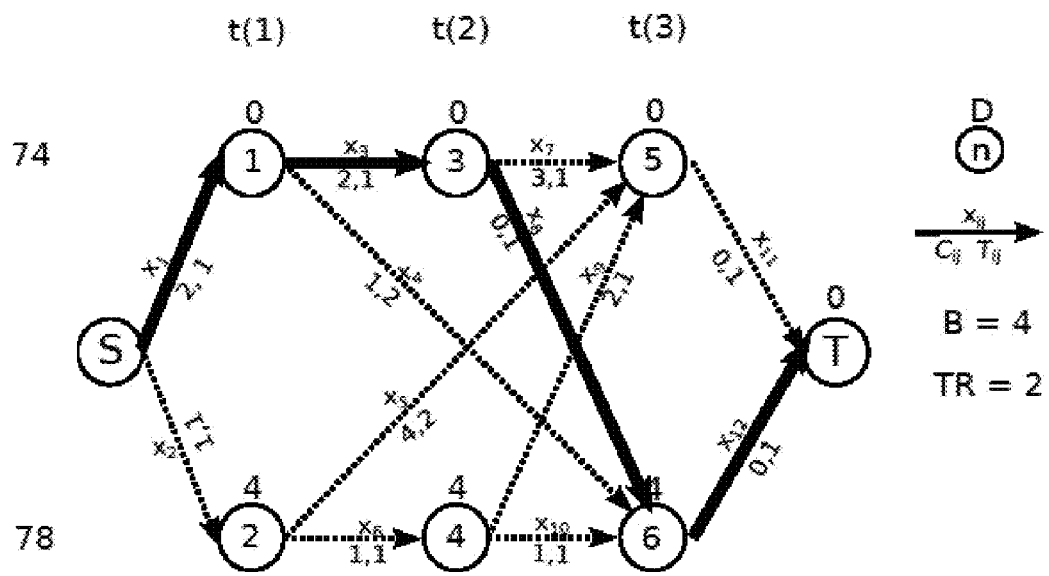
FIG. 2A illustrates an example network flow model for HVAC optimization according to an exemplary embodiment of the present invention.

The HVAC optimization engine 128 selects the HVAC setpoints r* using a network flow model, which is best understood using a simplified example such as the one illustrated FIG. 2A. For simplicity, the system illustrated in FIG. 2A may only choose between two potential HVAC setpoints, either 74° F. (shown along the top row) or 78° F. (shown along the bottom row) during only three time periods: t(1), t(2), and t(3). The end user would prefer that the 74° F. setpoint be selected for all three time periods, but that setpoint schedule has the highest energy cost in this limited example. On the other end of the spectrum, selecting the 78° F. setpoint for all three time periods is the most energy efficient choice, but that is also the choice that requires the biggest comfort sacrifice. These and other potential HVAC optimization choices are illustrated in FIG. 2A as paths from a starting point S to an endpoint T.

Each potential HVAC setpoint is shown as nodes 1 through 6. Each node n is represented by a circle. For example, a 74° F. setpoint for time period t(1) is identified as node 1, whereas the 78° F. setpoint for time period t(1) is identified as node 2. The cost of each node n to user comfort is measured by the distance D (above each node) from the desired setpoint to the setpoint of each node n. In this example, because the desired HVAC setpoint r is a constant 74° F., node 1 may be chosen at no cost to the user's comfort whereas node 2 requires a 4° sacrifice to end user comfort. As shown in the key on the right, each arc x is shown with the energy/financial cost C of choosing that path and the time period T of each path. In the example shown, the user's energy/financial budget B is 4 and the transition limit TR is 2.

Figure 2B:
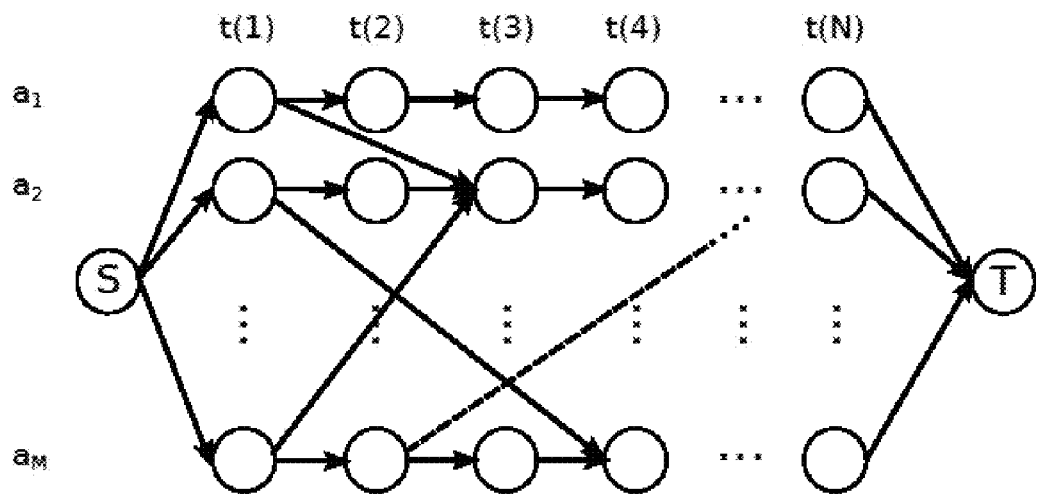
FIG. 2B illustrates a generalized network flow model for HVAC optimization according to an exemplary embodiment of the present invention.

FIG. 2B illustrates a generalized network flow model for HVAC optimization according to an exemplary embodiment of the present invention. FIG. 2B shows a node matrix A with M×N nodes, where M represents the number of potential HVAC setpoints $a_1$ through $a_M$ and N is the number of time periods t(1) through t(N). Node $A_{ij}$ represents HVAC setpoint $a_i$ at time j. An arc($A_{i1j1}$, $A_{i2j2}$) linking nodes $A_{i1j1}$ and $A_{i2j2}$ represents a setpoint transition. In other words, arc($A_{i1j1}$, $A_{i2j2}$) represents a setpoint change from $a_{i1}$ at time $j_1$ to $a_{i2}$ at time $j_2$. Because ramp up and ramp down sections take time for the indoor temperature to transit from the current setpoint to a new setpoint, the time needed for the setpoint transitions is estimated using the methods described above and is reflected in the network by connecting the corresponding nodes in the correlated column. The system cannot, for example, transition from setpoint $a_1$ at time t(1) to setpoint $a_2$ at time t(2). As illustrated by arc($A_{11}$, $A_{32}$), transition from setpoint $a_1$ from time t(1) to setpoint $a_2$ is estimated to take until time t(3). One more constraint is that no arcs exist between nodes within the same column (based on the assumption that only one setpoint can be set at one time).

The mass of flow on each arc is defined as $x_{ij}$, the variable to be optimized over. The distance $D_{ij}$ between the user-preferred setpoint $r_j$ and the setpoint $r_{ij}$* selected by the HVAC optimization engine 128 is defined as $D_{ij}=|r_j-r_{ij}^*|$. Finally, the cost $C_{ij}$ of an arc(i,j) between node i,j is determined by the cost modelling unit 124 as described above.

The setpoint optimization problem can be formulated mathematically as shown in Equations (8) through (12):

$$\text{Minimize} \sum_{(i,j) \in A} D_{ij} x_{ij} \quad (8)$$

subject to $$\sum_{(i,j) \in A} C_{ij} x_{ij} \leq B \quad (9)$$

$$tran = \sum_{(i,j) \in A} x_{ij} \text{transit}(i, j) \leq TR \quad (10)$$

$$\sum_{\{x(i,j) \in A\}} x_{ij} - \sum_{\{x(i,j) \in A\}} x_{ji} = b(i), \text{ for all } i \in N \quad (11)$$

$$l_{ij} \leq x_{ij} \leq U_{ij}, \text{ for all}(i, j) \in A \quad (12)$$

where $D_{ij}x_{ij}$ is the temperature distance, $C_{ij}x_{ij}$ is the financial cost, B is the budget, tran is the total number of transitions, and TR is the transition limit. The total number of transitions tran is calculated using the function transit( ), which checks if the HVAC setpoint of a node is the same as the previous node. The transit( ) function may be illustrated mathematically as shown in Equation (13):

$$\text{transit}(i, j) = \begin{cases} 0 & \text{value}(i) = \text{value}(j) \\ 1 & \text{otherwise} \end{cases} (i, j) \subset A \quad (13)$$

where i is the current node, and j is the previous node, and value( ) is the HVAC setpoint value of the node.

Equation (11) is referred to as mass balance constraints, where the first term represents the outflow of the node i and the second term represents the inflow of the node i. As shown in Equation (12), the amount of flow on each arc should also satisfy the minimum limit l and the maximum limit U of that arc, which are referred as flow bound constraints as required by the optimization algorithm.

The optimization task is now as follows: at each time step t, new sensor readings and up-to-date monetary cost as well as the number of transitions are gathered and utilized to update the corresponding constraints B and TR. The new sensor reading may be utilized by the prediction engine to update the linear regression process. Then, all nodes within a given time scope are considered and the corresponding arcs are generated. The distance and cost values are determined for each node and arc as well as the number of the transitions. A SIMPLEX algorithm is used to generate an optimal solution to the problem.

Figure 3:
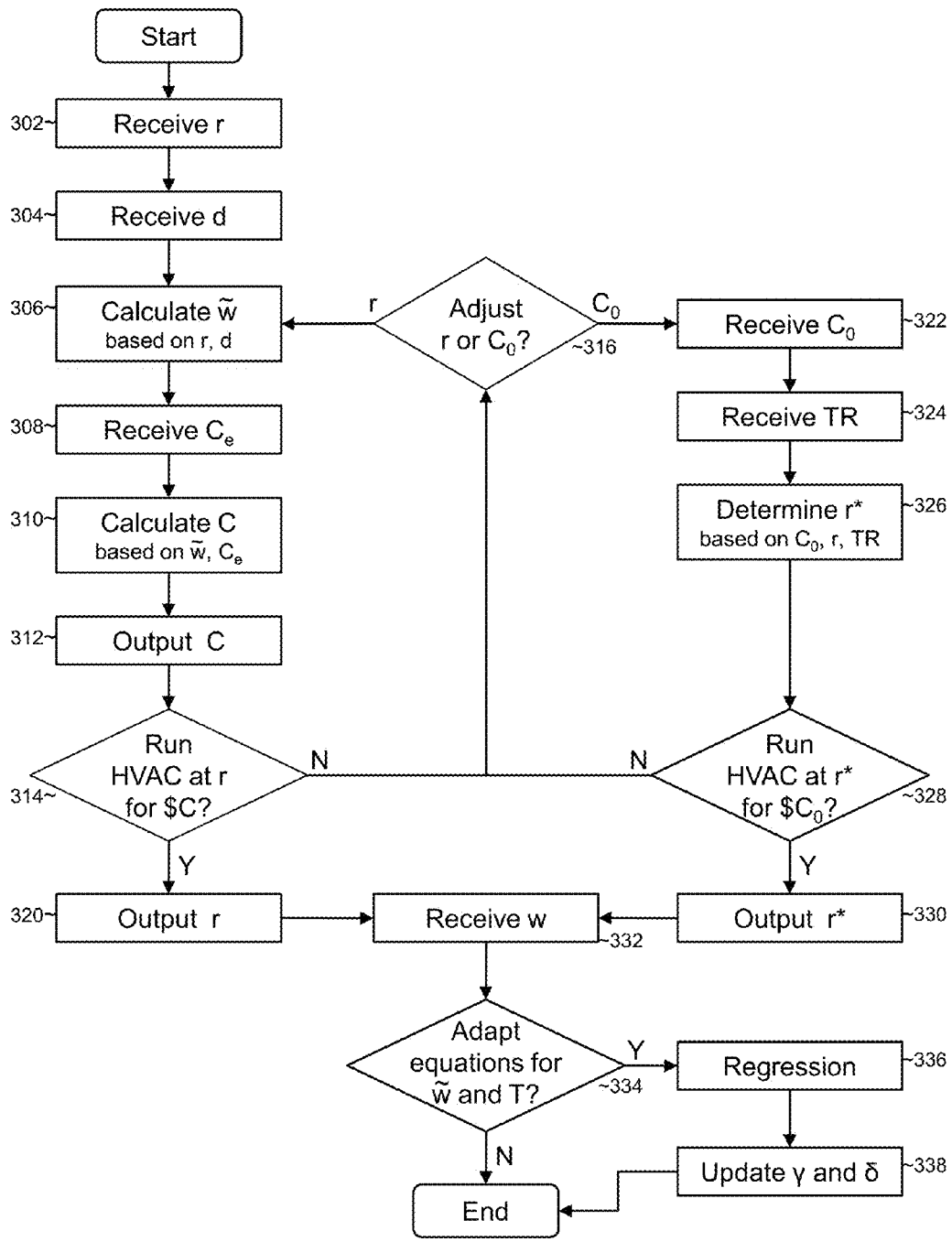
FIG. 3 is a flowchart of an HVAC optimization method according to an exemplary embodiment of the present invention.

FIG. 3 is a flowchart of an HVAC optimization method according to an exemplary embodiment of the present invention.

The HVAC prediction engine 126 receives the desired HVAC setpoints r from the end user (for example, using the GUI 140) in step 302. The HVAC prediction engine 126 receives the outdoor temperature d (for example, from a government agency or weather forecasting service) in step 304 and calculates the predicted HVAC usage $\tilde{w}$ based on the desired HVAC setpoints r and the outdoor temperature d in step 306. The cost modelling unit 126 receives the energy cost $C_e$ in step 308 and estimates a cost C of the desired HVAC setpoints r based on the predicted HVAC usage $\tilde{w}$ and the energy cost $C_e$ in step 310. The estimated cost C is output to an end user (for example, using the GUI 140) in step 312. By providing the end user with a near-immediate cost estimate C of the desired HVAC setpoints r, the end user is able to make a better informed decision on whether the desired HVAC setpoints r sufficiently balance individual comfort and energy/financial cost.

In step 314, the end user decides whether to run the HVAC unit 116 based on the desired HVAC setpoints r. If so, the desired HVAC setpoints r are output by the monitor 112 to the thermostat 114 for controlling the HVAC unit 116 in step 320. If the end user determines that the estimated cost C is too high and decides not to run the HVAC unit 116 based on the desired HVAC setpoints r (Step 314: No), the end user may instead adjust the desired HVAC setpoints r or input/adjust a desired cost $C_0$ (for example, using the GUI 140) in step 316. If the end user adjusts the desire HVAC setpoints r, the predicted HVAC usage $\tilde{w}$ is re-calculated by the HVAC prediction engine 126 in step 306.

If the end user inputs/adjusts the desired cost $C_0$, the desired cost $C_0$ and transition limit TR are received by the HVAC optimization engine 128 in steps 322 and 324. The transition limit TR may be input or adjusted by the user, for example through the GUI 140, or the HVAC optimization engine 128 may store a set transition limit TR. The HVAC optimization engine determines optimized HVAC setpoints r* based on the desired cost $C_0$, the desired HVAC setpoints r, and the transition limit TR in step 326. In step 314, the end user decides whether to run the HVAC unit 116 based on the optimized HVAC setpoints r*. If so, the monitor 112 outputs optimized HVAC setpoints r* to the thermostat 114 for controlling the HVAC unit 116 in step 320. If not, end user may adjust the desired HVAC setpoints r and/or the desired cost $C_0$ in step 316.

After the monitor 112 outputs either the desired HVAC setpoints r (Step 320) or the optimized HVAC setpoints r* (Step 332), the system 100 receives the observed HVAC usage data w in step 322 and determines whether to update the formulas for determining the estimated HVAC usage $\tilde{w}$ in step 324. If so, regression analysis is performed in step 326 and the formulas for determining estimated HVAC usage $\tilde{w}$ are updated based on the regression analysis in step 326.

Figure 4A:
FIGS. 4A and 4B are exemplary embodiments of the graphical user interface illustrated in FIG. 1.
Figure 4B:
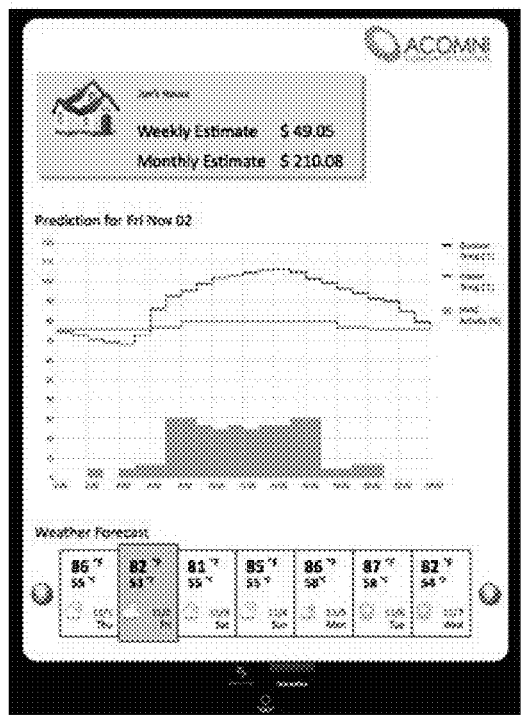

FIGS. 4A and 4B are exemplary embodiments of the graphical user interface 140 according to an exemplary embodiment of the present invention. As illustrated in FIG. 4A, the GUI 140 may enable the end user to input the desired cost $C_0$ and/or one or more desired HVAC setpoints r. The desired HVAC setpoints r may be a constant temperature or a series of temperatures. Also, as described above, there may be time periods where the end user does not have a desired HVAC setpoint (for example, time periods where the user expects to be out of the house.) As shown in FIG. 4B, the GUI may present to the user, for example, the predicted outdoor temperature d, the indoor temperature (which is assumed to be equal to the HVAC setpoint), predicted HVAC usage $\tilde{w}$, and the estimated cost C to control the HVAC unit 116 based on the desired HVAC setpoints r. The GUI 140 may be stored (for example, on the server 120) as computer readable instructions to be executed by a processor. The GUI 140 may be presented as part of a local or web-based program accessible by a computer, tablet, smartphone, or any other device configured to send and receive information to and from an end user.

Figure 5A:
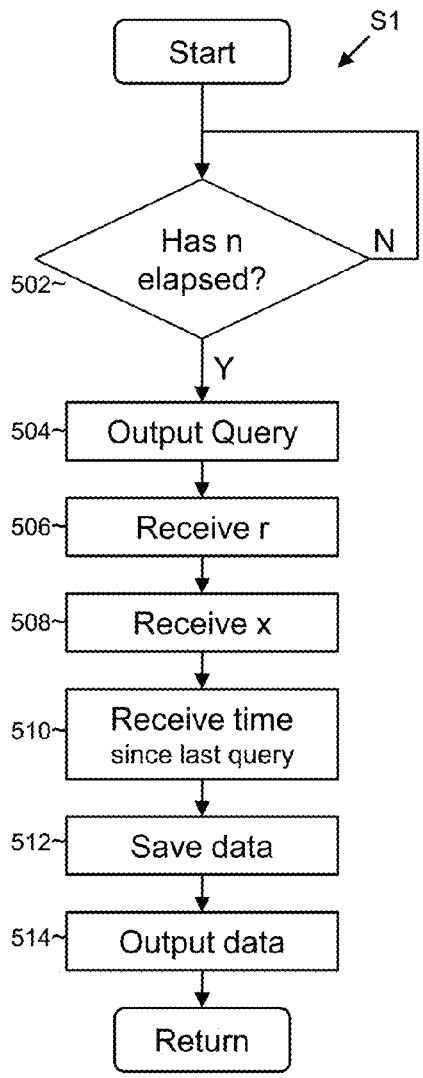
FIGS. 5A and 5B are flowcharts of processes performed by the monitor illustrated in FIG. 1, according to an exemplary embodiment of the present invention.
Figure 5B:
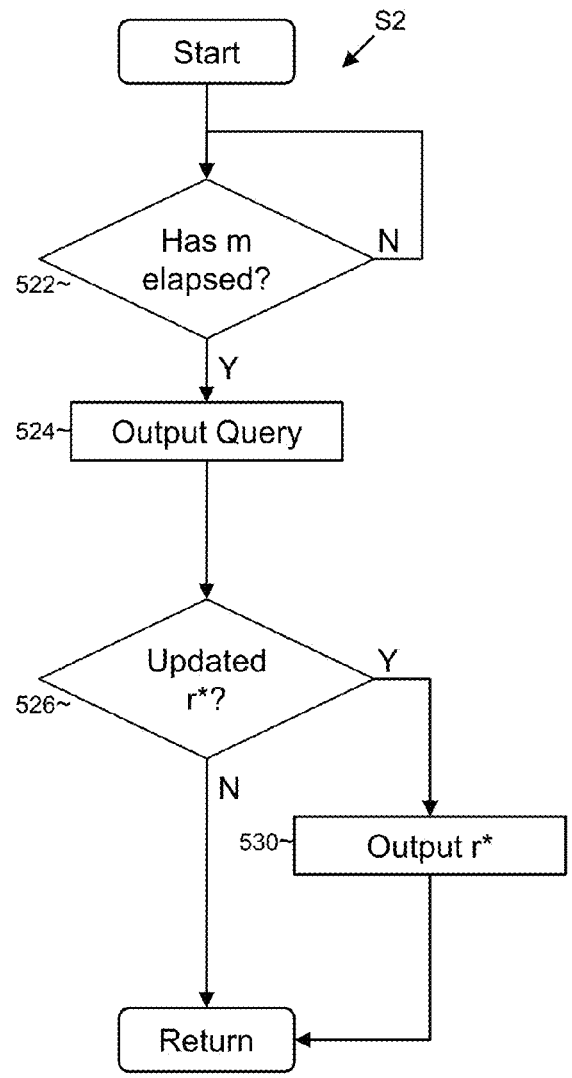

FIGS. 5A and 5B are flowcharts of processes S1 and S2 performed by the monitor 112 illustrated in FIG. 1 according to an exemplary embodiment of the present invention. The monitor performs the process S1 illustrated in FIG. 5A and the process S2 illustrated in FIG. 5B concurrently. In process S1, the monitor 112 determines if a sampling period n (for example, 5 minutes) has elapsed in step 502. After the sampling period n has elapsed (Step 502: Yes), the monitor 112 outputs a query to the thermostat 114 requesting data in step 504. The data may be, for example, the current setpoint r, the current indoor temperature x, and the time that has elapsed since the last query. The monitor 112 receives current setpoint r in step 506, the current indoor temperature x in step 508, and the time that has elapsed since the last query in step 510. The data is saved in step 512 and output to the server in step 514.

In process S2, the monitor 112 determines if a sampling period m (for example, 1 minute) has elapsed in step 522. After the sampling period m has elapsed (Step 522: Yes), the monitor 112 proceeds to step 524 and outputs a query to the server 120 to determine if the end user has requested a change in the current HVAC setpoints r* since the last query. The monitor 112 determines whether the HVAC setpoints r* have changed in response to output from the server 120 in step 526. If the end user has made changes to the HVAC setpoints r* (Step 526: Yes), the monitor 112 outputs the updated HVAC setpoints r* to the thermostat 116 in step 530. The monitor 112 repeatedly performs the processes S1 and S2.

Figure 6:
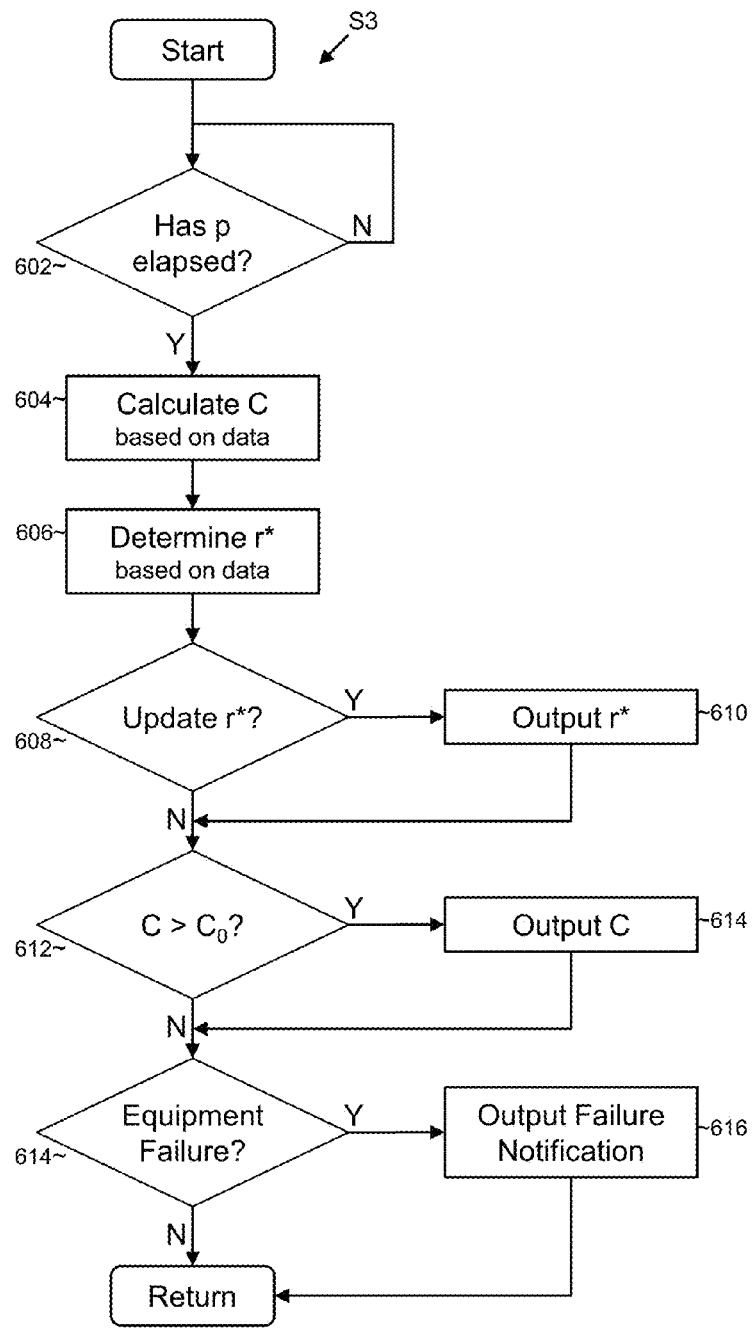
FIG. 6 is a flowchart of a process performed by the server illustrated in FIG. 1, according to an exemplary embodiment of the present invention.

FIG. 6 is a flowchart of a process S3 performed by the server 110 according to an exemplary embodiment of the present invention. The process S3 is performed concurrently by the server 120 while the monitor 112 performs the processes S1 and S2. In process S3, the server 120 determines if a sampling period p (for example, 1 hour) has elapsed in step 602. After the sampling period p has elapsed (Step 602: Yes), the cost modelling unit 124 calculates the predicted cost C of the current HVAC setpoints r* in step 604 and the HVAC optimization engine 128 determines optimized HVAC setpoints r* in step 506. Each updated calculation of the predicted cost C and optimized HVAC setpoints r* may be based on updated data received from the thermostat 114 by the monitor 112. The HVAC optimization engine 128 determines if it is necessary to output updated HVAC setpoints r* step 608 and, if so outputs the updated HVAC setpoints r* in step 610. If the predicted cost C calculated in step 604 is more than the desired cost $C_0$, the server outputs the predicted cost C to the user via the GUI 140 in step 614. The fault detection unit 127 determines if there is an equipment failure in step 614 and, if so, outputs a failure notification in step 616. The server 110 repeatedly performs the process S3.

Figure 7:
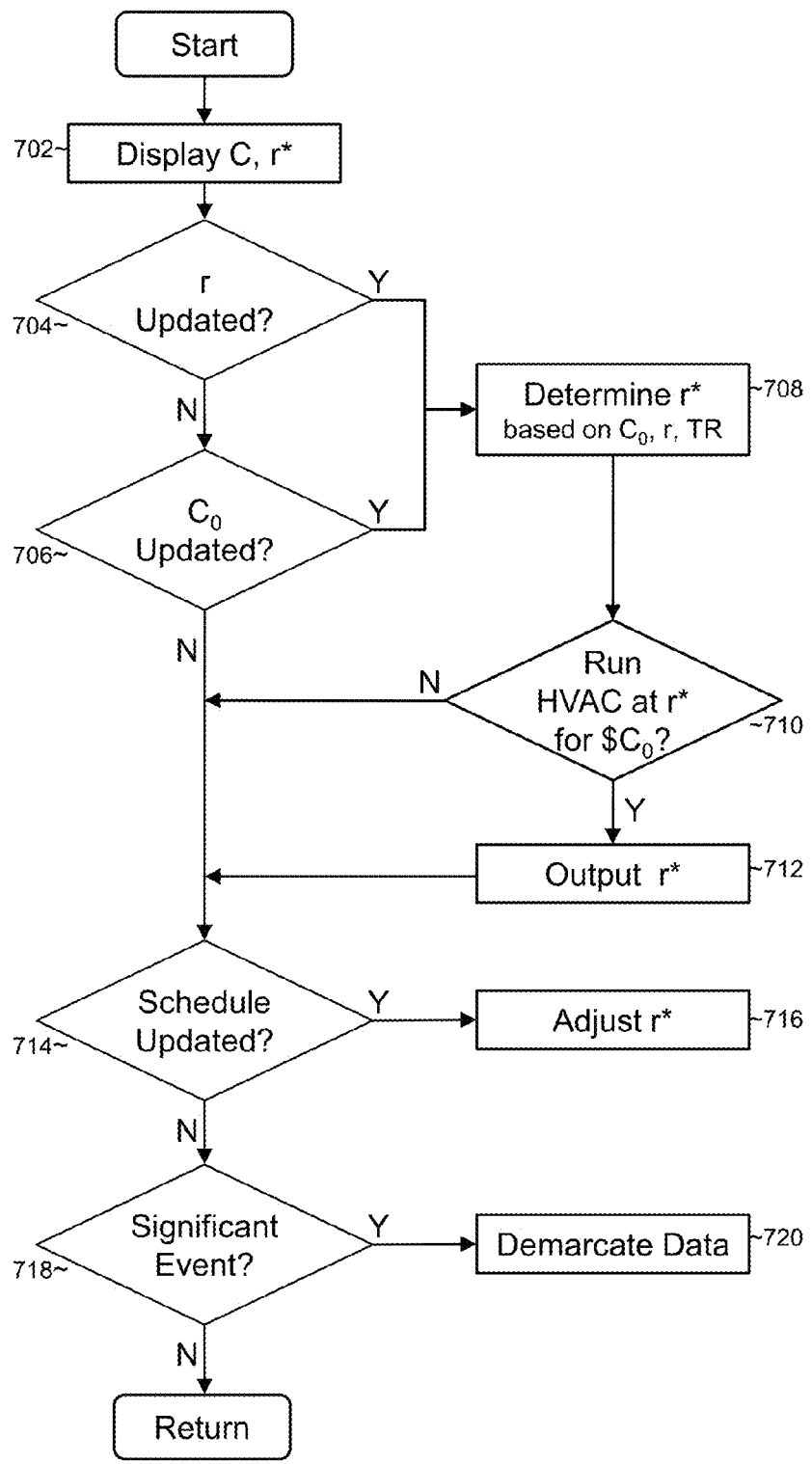
FIGS. 7 and 8 are flowcharts of processes performed by the graphical user interface illustrated in FIG. 1, according to an exemplary embodiment of the present invention.
Figure 8:
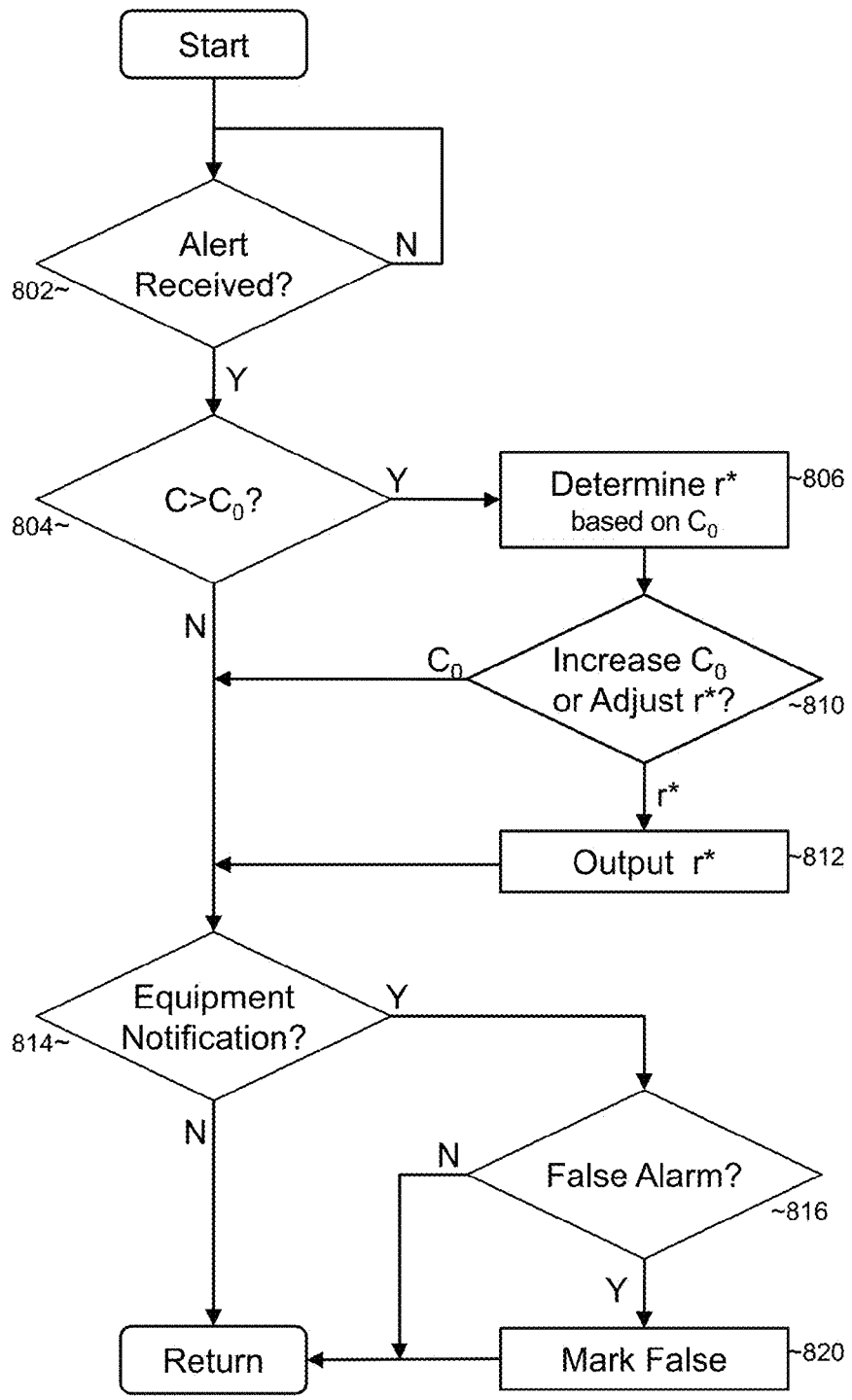

FIGS. 7 and 8 are flowcharts of processes performed by the GUI 140 according to an exemplary embodiment of the present invention. Referring to FIG. 7, the GUI 140 displays the current HVAC setpoints r* and the current cost C to the user in step 702. If the user updates the desired HVAC setpoints r (Step 704: Yes) or the desired cost $C_0$ (Step 706: Yes), the HVAC optimization engine 128 re-calculates optimized HVAC setpoints r* based on the desired HVAC setpoints r and desired cost C0 in step 708. The user determines whether to run the HVAC unit 116 at the optimized HVAC setpoints r* for the desired cost C0 in step 710. Is so (Step 710: Yes), the optimized HVAC setpoints r* are output by the monitor 112 to the thermostat 114. If the end user updates the schedule of when the end user does not expect to be inside the structure 110 and therefore does not have a desired HVAC setpoint r (Step 714: Yes), the HVAC optimization engine 128 updates the optimized HVAC setpoints r* and the monitor 112 outputs the updated setpoints to the thermostat in step 716. If the end user indicates that a significant event affecting HVAC efficiency has occurred in step 718, the system 100 demarcates the data in step 720. For example, if the end user indicates that the HVAC unit 116 was run with the windows open, the system 200 demarcates the data as not characteristic of future behaviour and will therefore not use that time period when building linearization models to predicting future HVAC usage $\tilde{w}$, etc. In another example, if the end user indicates that coolant has been recharged or a filter has been replaced the system 100 demarcates the time period before the efficiency change as less indicative of future efficiency than the time period after, and discounts the time period before the HVAC efficiency increase when building linearization models.

Referring to FIG. 8, if an alert is received from the server 120 (Step 802: Yes), the GUI 140 determines whether the alert is related to the budget (Step 804) or an equipment notification (Step 814). As described above in step 612 of FIG. 6, the cost modelling unit 124 determines whether the predicted cost C is more than the desired cost $C_0$ by a predetermined threshold and, if so, outputs the predicted cost C to the user via the GUI 140. In response to an alert from the cost modelling unit 124 that the predicted cost C is greater than the desired cost $C_0$ by a predetermined threshold (Step 804: Yes), the end user must decide whether to adjust the HVAC setpoints to conform to the desired cost $C_0$ or increase the desired cost $C_0$ and maintain the HVAC setpoints. The HVAC optimization engine determines adjusted HVAC setpoints r* that conform to the desired cost $C_0$ in step 806. The end user decides in step 810 whether to output the adjusted HVAC setpoints r* in step 810 that conform to the desired cost $C_0$ or increase the desired cost $C_0$ that conform to the current HVAC setpoints r* in step 810. If the end user elects to adjust the HVAC setpoints r* (Step 810: Yes), the adjusted HVAC setpoints r* are output to the thermostat 114 by the monitor 112 in step 812.

As described above in step 614 of FIG. 6, the fault detection unit 127 determines if there is an equipment failure and outputs a failure notification to the end user via the GUI 140. If a failure notification is received (Step 814: Yes), the end user determines whether the failure notification is a false alarm in step 816 and, if so the failure notification is marked false in step 820.

The foregoing description and drawings should be considered as illustrative only of the principles of the inventive concept. Exemplary embodiments may be realized in a variety of shapes and sizes and are not intended to be limited by the preferred embodiments described above. Numerous applications of exemplary embodiments will readily occur to those skilled in the art. Therefore, it is not desired to limit the inventive concept to the specific examples disclosed or the exact construction and operation shown and described. Rather, all suitable modifications and equivalents may be resorted to, falling within the scope of this application.

What is claimed is:

1. A heating ventilation and air conditioning (HVAC) management system, comprising:
    a monitor configured to receive a user defined cost constraint and one or more user-preferred temperature setpoints and to output one or more optimized temperature setpoints for a thermostat to control an HVAC unit such that the HVAC unit heats and/or cools a structure to the one or more optimized temperature setpoints;
    an HVAC prediction engine configured to determine a predicted HVAC usage of the HVAC unit based on an outdoor temperature for a geographic area that includes the structure and one or more temperature setpoints;
    a cost modeling unit configured to determine, based on the predicted HVAC usage and energy costs, a predicted cost to control the HVAC unit based on the one or more temperature setpoints; and
    an HVAC optimization engine configured to select one or more optimized temperature setpoints using an algorithm to generate an optimal solution to a mass balance equation such that the predicted cost to control the HVAC unit based on the one or more optimized temperature setpoints is less than or equal to the user defined cost constraint and temperature distance between the one or more user-preferred temperature setpoints and the one or more optimized temperature setpoints is minimized.

2. The system of claim 1, wherein the temperature distance is an absolute value of a difference between each of the one or more optimized temperature setpoints and one or more user-preferred temperature setpoints.

3. The system of claim 1, wherein the optimization engine is further configured to select the one or more optimized temperature setpoints such that a number of setpoint transitions is less than or equal to a predetermined maximum number of setpoint transitions.

4. The HVAC management system of claim 1, wherein the HVAC prediction engine is configured to store:
    a plurality of ramp up constants, each of the plurality of ramp up constants correlating to one of the temperature setpoints and a plurality of potential changes in setpoints; and
    a plurality of ramp down constants, each of the plurality of ramp down constants correlating to one of the temperature setpoints and a plurality of potential changes in setpoints,
    wherein the one or more temperature setpoints comprise a first temperature setpoint for controlling the HVAC unit during a first time period and a second a second temperature setpoint for controlling the HVAC unit during a second time period immediately following the first time period.

5. The system of claim 4, wherein, if the second temperature setpoint is greater than the first temperature setpoint and the outdoor temperature is greater than the second temperature setpoint, the HVAC prediction engine calculates the predicted HVAC usage by:
    calculating a predicted ramp up time period for an indoor temperature of the structure to rise to the second temperature setpoint with a minimum HVAC usage by selecting the ramp up constant that correlates to the second temperature setpoint and the difference between the second and first temperature setpoints and multiplying the selected ramp up constant by the difference between the outdoor temperature and the second temperature setpoint; and
    multiplying the minimum HVAC usage by the predicted ramp up time period.

6. The system of claim 5, wherein the minimum HVAC usage is 0.

7. The system of claim 4, wherein, if the second temperature setpoint is less than the first temperature setpoint and the outdoor temperature is greater than the second temperature setpoint, the HVAC prediction engine calculates the predicted HVAC usage by:
    calculating a predicted ramp down time period for an indoor temperature of the structure to fall to the second temperature setpoint with a maximum HVAC usage by selecting the ramp down constant that correlates to the second temperature setpoint and the difference between the second and first temperature setpoints and multiplying the selected ramp down constant by a difference between the outdoor temperature and the second temperature setpoint; and
    multiplying the maximum HVAC usage by the predicted ramp down time period.

8. The system of claim 7, wherein the maximum HVAC usage is a percentage of time the HVAC unit is on while receiving a signal from the thermostat to cool the structure.

9. The system of claim 4, wherein, if the second temperature setpoint is greater than the first temperature setpoint and the outdoor temperature is less than the second temperature setpoint, the HVAC prediction engine calculates the predicted HVAC usage by:
    calculating a predicted ramp up time period for an indoor temperature of the structure to rise to the second temperature setpoint with a maximum HVAC usage by selecting the ramp up constant that correlates to the second temperature setpoint and the difference between the second and first temperature setpoints and multiplying the selected ramp up constant by the difference between the outdoor temperature and the second temperature setpoint; and
    multiplying the maximum HVAC usage by the predicted ramp up time period.

10. The system of claim 9, wherein the maximum HVAC usage is a percentage of time the HVAC unit is on while receiving a signal from the thermostat to heat the structure.

11. The system of claim 6, wherein, if the second temperature setpoint is less than the first temperature setpoint and the outdoor temperature is less than the first or second temperature setpoints, the HVAC prediction engine calculates the predicted HVAC usage by:
calculating a predicted ramp down time period for an indoor temperature of the structure to fall to the second temperature setpoint with a minimum HVAC usage by selecting the ramp down constant that correlates to the second temperature setpoint and the difference between the second and first temperature setpoints and multiplying the selected ramp down constant by a average difference between the outdoor temperature and the second temperature setpoint; and
multiplying the minimum HVAC usage by the predicted ramp down time period.

12. The system of claim 11, wherein the minimum HVAC usage is 0.

13. The system of claim 1, wherein the HVAC prediction engine stores a plurality of equilibrium constants, each of the plurality of equilibrium constants correlating to one of the temperature setpoints, and, in response to a determination by the HVAC prediction engine that one of the one or more temperature setpoints has been output by the monitor for a predetermined time period, the HVAC prediction engine calculates the predicted HVAC usage by selecting the equilibrium constant that correlates to the temperature setpoint output by the monitor and multiplying the selected equilibrium constant by an average difference between the outdoor temperature and the temperature setpoint output by the monitor.

14. The system of claim 1, wherein the predicted HVAC usage of the HVAC unit is further based on a predicted temperature of the structure.

15. The system of claim 1, wherein, if a predicted indoor temperature of the structure is between a heating temperature setpoint and a cooling temperature setpoint of the HVAC unit, the HVAC prediction engine configured to determine that the predicted HVAC usage is zero.

16. The system of claim 1, wherein the outdoor temperature is received from a weather forecasting service or government agency.

17. The system of claim 1, wherein the HVAC prediction engine is configured to determine the predicted HVAC usage of the HVAC unit based on formulas or variables.

18. The system of claim 17, wherein one or more temperature setpoints includes a current temperature setpoint and the monitor is configured to receive information indicative of the current temperature setpoint and an indoor temperature of the structure from the thermostat and output the information to the HVAC prediction engine.

19. The system of claim 18, wherein the HVAC prediction engine is configured to update the formulas and/or variables used to determine the predicted HVAC usage of the HVAC unit based on the information received from the monitor.

20. The system of claim 18, wherein the HVAC prediction engine is configured to update the formulas and/or variables used to determine the predicted HVAC usage of the HVAC unit using on linear regression.

21. A method for managing heating ventilation and air conditioning (HVAC), the method comprising:
receiving a user defined cost constraint;
receiving one or more user-preferred temperature setpoints for a thermostat to control an HVAC unit such that the HVAC unit heats and/or cools a structure to the one or more optimized temperature setpoints;
determining a predicted HVAC usage of the HVAC unit based on an outdoor temperature for a geographic area that includes the structure and one or more temperature setpoints;
determining, based on the predicted HVAC usage and energy costs, a predicted cost to control the HVAC unit based on one or more temperature setpoints;
selecting one or more optimized temperature setpoints using an algorithm to generate an optimal solution to a mass balance equation such that the predicted cost to control the HVAC unit is less than or equal to a user defined cost constraint and temperature distance between one or more user-preferred temperature setpoints and the one or more optimized temperature setpoints is minimized.

* * * * *